HIGH-PRESSURE AUTOMATIC IRRIGATION FLUID CHANGER

Filed March 14, 1963 4 Sheets-Sheet 1

Louis D. Cogdell
INVENTOR.
BY Clarence A. O'Brien
and Harvey B. Jacobson
Attorneys Louis D. Cogdell
INVENTOR.

BY Clarence A. O'Brien
and Harvey B. Jacobson
Attorneys

April 27, 1965 L. D. COGDELL 3,180,358

HIGH-PRESSURE AUTOMATIC IRRIGATION FLUID CHANGER

Filed March 14, 1963 4 Sheets-Sheet 3

Louis D. Cogdell

INVENTOR.

BY Clarence A. O'Brien and Harvey B. Jacobson

Attorneys

Louis D. Cogdell
INVENTOR.
BY Clarence A. O'Brien
and Harvey B. Jacobson
Attorneys United States Patent Office 3,180,358

Patented Apr. 27, 1965

3,180,358

HIGH-PRESSURE AUTOMATIC IRRIGATION FLUID CHANGER

Louis D. Cogdell, 601 N. Emerald, Crosbyton, Tex.

Filed Mar. 14, 1963, Ser. No. 265,127
2 Claims. (Cl. 137—624.11)

This invention relates to a valve control assembly through which fluid such as water may be automatically redestributed for irrigation and other similar purposes.

It is therefore a primary object of the present invention to provide an automatic valve control mechanism particularly suited for re-routing of fluid under high pressure in an automatic fashion and in a reliable manner.

Another object of the present invention is to provide automatic means for operating a valve assembly having a plurality of outlets, the valve assembly being operative to change the outlet from which fluid under pressure is discharged and achieving this function in a reliable manner so as to maintain the closed outlet in a pressure sealed condition. The control mechanism of the present invention is therefore ideally suited for effecting the aforementioned automatic change in the fluid outlet without any danger of leakage and without the necessity for human supervision to insure that the valve is seated in a non-leaking condition.

In accordance with the foregoing objects, the fluid changing mechanism is operative to axially move a valve assembly between two operative valve seating positions by rotation thereof, rotation being retarded when the valve is seated in one of its operative positions closing one of the outlets. Torque responsive mechanism sensing the retarded rotation of the valve is thereby operative to stop axial movement and lock the valve against axial movement in both directions until another change is called for by manual operation of the switch controlling the direction of drive and reset of a timer. When this occurs, rotation of the valve assembly is reversed so as to unlock it in order to permit axial movement in the opposite direction for movement against another outlet valve seat.

The valve changing mechanism of the present invention includes as additional features, a selectively set timer whereby valve changing movements may be effected at any time desired particularly when no operator will be available at such time. Also, the valve mechanism includes a control panel through which the torque sensing operation aforementioned is achieved and by means of which the operative condition of the mechanism may be tested and illumination provided for the timer should setting thereof be necessary at an installation otherwise having no illumination.

These together with other objects and advantages which will become subsequently apparent resdie in the details of construction and operation as more fully hereinafter described and claimed, reference being had to the accompanying drawings forming a part hereof, wherein like numerals refer to like parts throughout, and in which:

Figure 2:
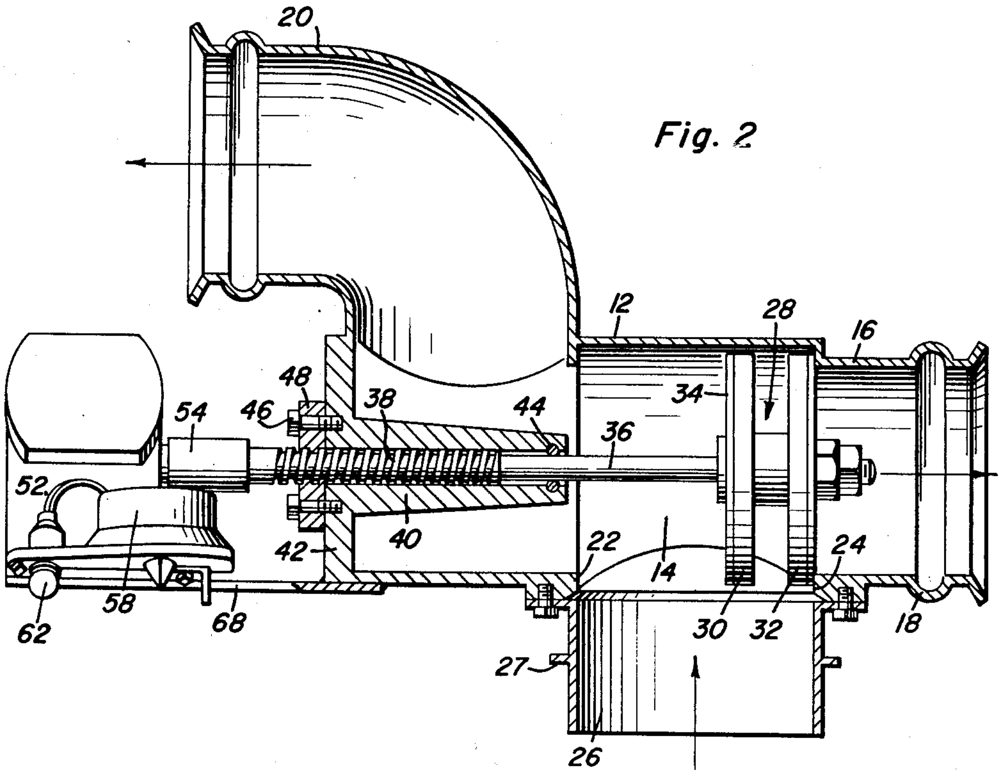
FIGURE 2 is a longitudinal sectional view through the valve changing mechanism.

Referring now to the drawings in detail, it will be observed that the valve changing assembly generally referred to by reference numeral 10 includes a tubular valve body or housing 12 forming a valve chamber 14 therein as more clearly seen in FIGURE 2. The valve chamber is axially aligned with an outlet section 16 having a pipe coupling formation 18 thereon. An arcuate outlet section 20 is also connected to the valve housing 12. Formed within the valve chamber 14 in axial spaced relation to each other, are a pair of valve seats 22 and 24 respectively defining circular outlet openings establishing fluid communication between the valve chamber 14 and the outlet sections 16 and 20. An inlet section 26 having lock elements 27 is connected to the valve housing 12 and extends perpendicular to the longitudinal axis of the valve housing 12.

Figure 4:
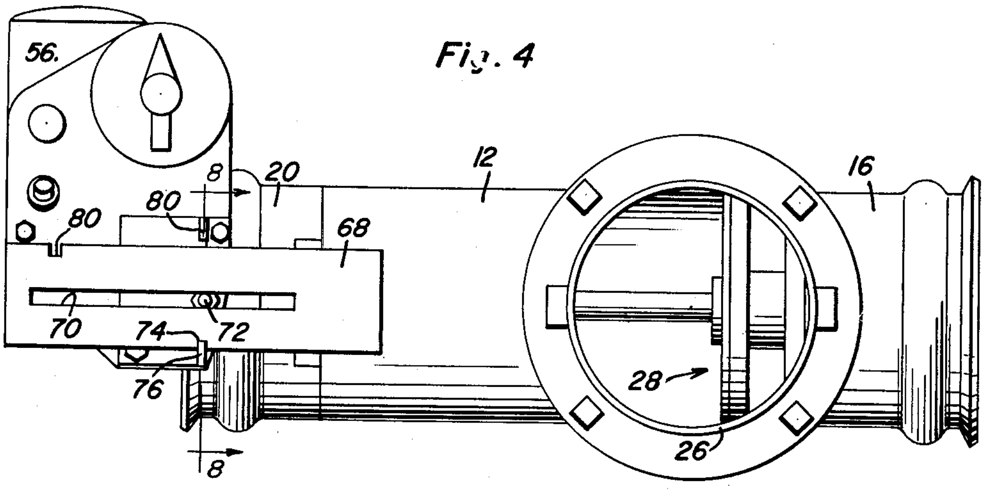
FIGURE 4 is a top plan view of the valve changing assembly shown in one operative condition.

Axially movable within the valve chamber 12 between the valve seats 22 and 24, is a spool valve assembly generally referred to by reference numeral 28. The spool valve assembly includes a pair of circular valve members 30 and 32 adapted to respectively engage the valve seats 22 and 24 to respectively close the associated outlets in order to direct fluid from the inlet section 26 to one of the two outlet sections 16 and 20. Each of the valve members 30 and 32 is therefore provided with oppositely facing resilient seating material 34 so as to seal the openings defined by the valve seats when in engagement therewith. The resilient material 34 will also be operative to retard rotation of the spool valve assembly for purposes to be hereafter explained. Thus, as illustrated in FIGURES 2 and 4, the spool valve assembly is seated on the valve seat 24 so as to close the outlet opening associated therewith. The spool valve assembly may be axially displaced from this operative position to the operative position illustrated in FIGURE 5 in order to close the outlet opening defined by the valve seat 22. Accordingly, the spool valve assembly is disposed in spaced relation to the valve housing 12 within the valve chamber 14 for free rotation and axial movement. Towards this end, a valve shaft 36 is connected to the spool valve assembly and has an externally threaded portion 38 slidably received within the journal bore of an elongated supporting journal formation 40 which projects inwardly from an end wall 42 of the valve housing 12. A sealing O-ring 44 is therefore seated within the bore of the journal support 40 adjacent the inner end thereof for wiping engagement with the spool valve shaft 36. Mounted exteriorly of the housing on the end wall 42 by means of the fasteners 46, is a nut element 48 which is internally threaded for threaded engagement with the external threaded portion 38 of the valve shaft. It will therefore be apparent, that when rotation is imparted to the valve shaft, its threaded engagement with the fixed nut 48 will produce axial movement of the valve shaft and the valve assembly connected thereto. It will also be apparent, that when the spool valve assembly engages one of the valve seats, rotation thereof will be retarded by means of which the valve seated condition of the valve assembly may be sensed.

A drive assembly is therefore provided in order to impart rotation to the valve shaft for effecting axial movement of the valve assembly between its two operative valve closing conditions. The drive assembly therefore includes a mounting plate or control panel 50 on which there is mounted a reduction gear assembly 52 the output of which is drivingly connected to the valve shaft through a coupling sleeve 54. A prime mover 56 is drivingly connected to the input of the reduction gear assembly and is mounted on the plate member 50 therewith so that in response to rotation being imparted to the valve shaft, the drive assembly may be moved axially wtih the valve assembly. The prime mover 56 may take any suitable form such as a spring-wound motor but preferably may be in the form of a reversible electric motor. Also mounted on the plate member 50 for movement with the drive assembly in response to rotation and axial movement of the valve assembly, is a timer mechanism 58 having a control knob 60 exposed in front of the mounting plate 50 adjacent to a test lamp 62 by means of which the operative condition of the mechanism may be indicated as well as illumination provided for the timer dial 64. The plate member 50 therefore also mounts below the lamp 62, a push button test switch 66 through which the test lamp 62 is illuminated should the mechanism be in operative condition. In order to operatively mount the plate member 50 for movement with the drive assembly relative to the valve body housing 12, a guide control plate member 68 is provided, this control plate being secured as by welding to the valve body and extending therefrom generally parallel to the valve shaft which projects from the housing.

Figure 1:
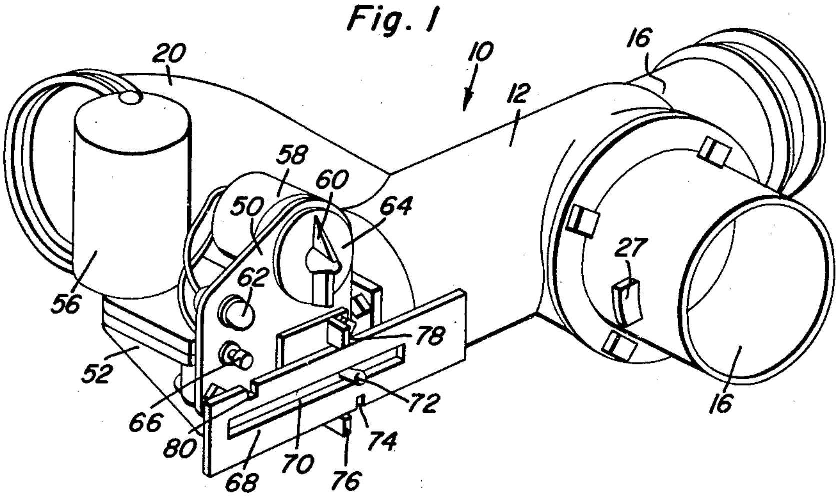
FIGURE 1 is a perspective view illustrating the automatic valve control assembly of the present invention in an operating condition.
Figure 3:
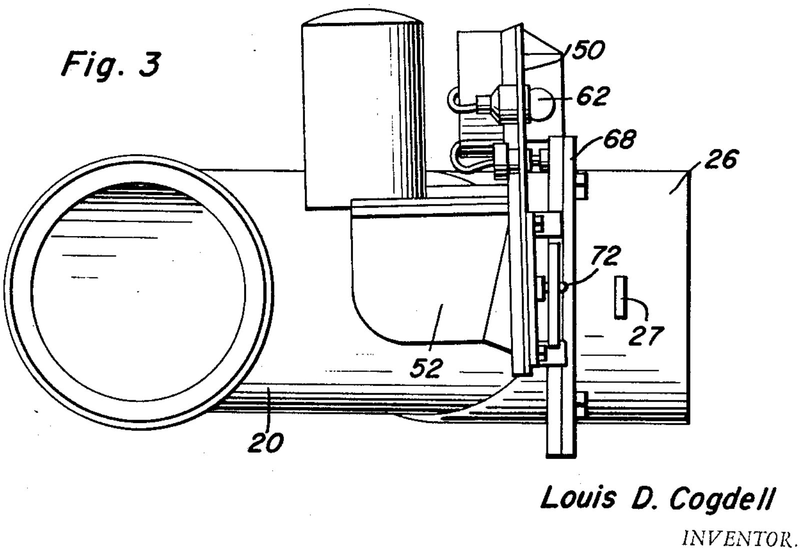
FIGURE 3 is a side elevational view of the valve changing assembly.
Figure 5:
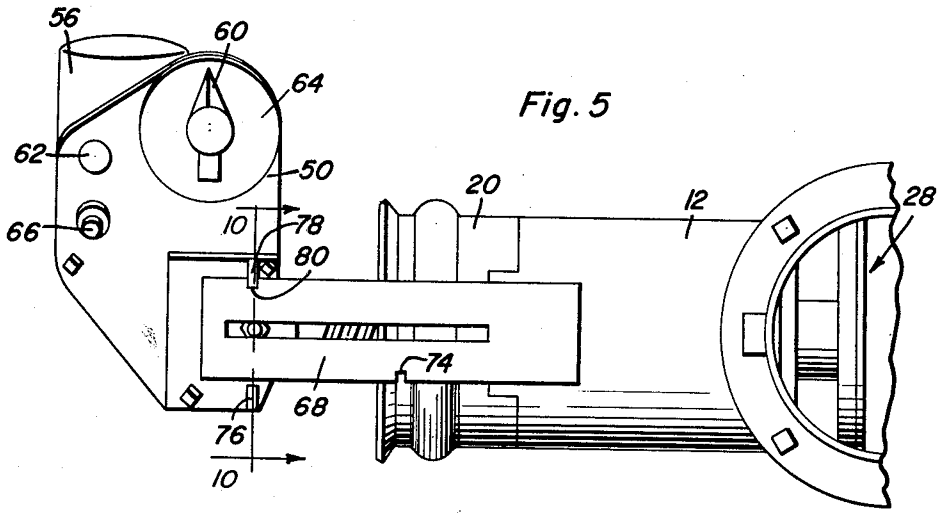
FIGURE 5 is a partial top plan view of the valve changing assembly shown in another operative condition.
Figure 7:
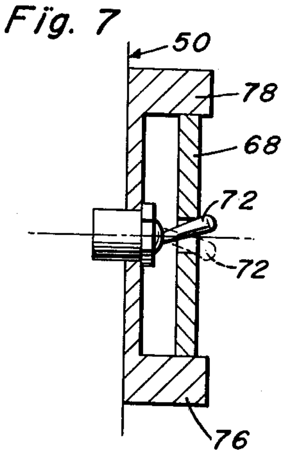
FIGURE 7 is an enlarged partial sectional view of the switch controlling mechanism in the operating condition corresponding to FIGURE 1.
Figure 8:
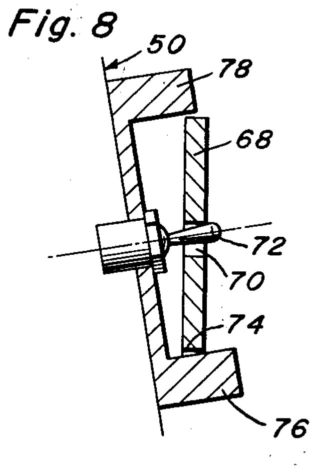
FIGURE 8 is a sectional view similar to FIGURE 7 but showing the control assembly stopped at one limit position taken substantially through a plane indicated by section line 8—8 in FIGURE 4.
Figure 9:
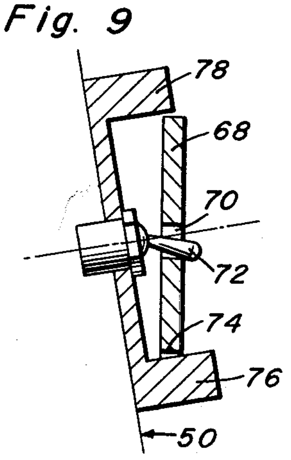
FIGURE 9 is a sectional view similar to FIGURE 8 but showing the control assembly conditioned for restarting.

The guide control plate 68 is provided with an elongated slot 70 through which a trip switch actuator 72 extends for control of a reversing switch associated with the motor 56. Actuation of the switch 72 will therefore be operative to condition the motor for reverse rotation, the direction of rotation being dependent upon the direction in which the actuator 72 is displaced. Switch actuators of this type are well known, such as double snap or toggle switches that have two operative positions wherein two different sets of contacts are bridged. Accordingly, when the drive assembly is being axially moved between the valve closing positions as illustrated in FIGURES 1 and 7, the switch actuator 72 will be within the slot 70 and displaced to one of two operative positions for effecting rotation of the motor 56 in one direction. If the valve assembly were in the valve closing position such as illustrated in FIGURES 2 and 4, the switch actuator 72 would have been displaced to a neutral position, by virtue of a limited angular displacement of the drive assembly in one direction, as shown in FIGURES 3 and 8 relative to the control plate 68. Limited angular displacement of the drive assembly is accommodated when it is axially disposed at one valve closing position by means of a limit control notch 74 receiving the lower guide projection 76 which extends from the mounting plate 50 for the drive assembly. Accordingly, in the valve closing position described, the drive assembly will be locked against axial movement in response to its limited angular displacement in one direction which angular displacement also disables operation of the motor 56 so as to stop axial movement. Thus, axial movement is stopped exactly when pressure-sealing engagement between the spool valve assembly and the valve seat is achieved without relying on the opening of the motor circuit by the timer 58 at the end of its operational cycle. Similarly, when the mechanism is in the other valve closing position such as illustrated in FIGURE 5, the drive assembly and mounting plate 50 therefor will be angularly displaced by a limited amount in the opposite direction so that the guide projection 78 will be received within the upper limit control notch 80 adjacent the outer end of the control plate 68. Each time the drive assembly is angularly displaced by the torque loading on the valve assembly, the switch actuator 72 will be displaced from one of two operative positions to de-energize the motor 56 and thereby disable the drive. Manually restoring the actuator 72 to an operative position as shown in FIGURE 9, from the neutral position as hereinbefore indicated by limited angular displacement will therefore condition the motor for rotation in the reverse direction when subsequently re-started by the timer 58. In this manner, reverse rotation of the valve assembly in its valve closing position will cause axial withdrawal of the valve assembly from engagement with the valve seat with which it was engaged so that the valve assembly may axially move into engagement with the other valve seat in order to effect a change in fluid flow from one outlet section to the other outlet section. Restarting of the motor 56 so as to displace the valve assembly from one closed position to another may be effected at any desired time through use of the timer mechanism 58.

Figure 6:
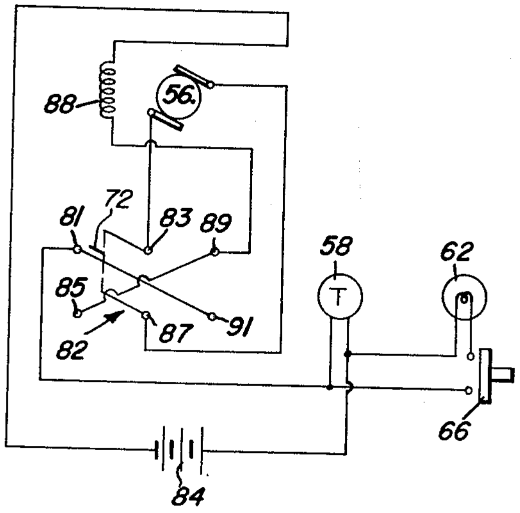
FIGURE 6 is an electrical circuit diagram associated with the valve changing mechanism.
Figure 10:
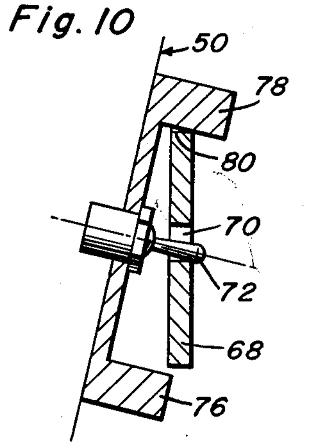
FIGURE 10 is a sectional view similar to FIGURE 7 but showing the control assembly stopped at the other limit position taken substantially through a plane indicated by the section line 10—10 in FIGURE 5.

Referring now to FIGURE 6 in particular, it will be observed that the electric motor being of the reversible type may include an armature 56 adapted to be connected in series with its field coil 88 through a reversing switch assembly 82 in the form of a conventional double pole, double throw switch and the timer mechanism 58 to a source of electrical energy 84. Accordingly, when the timer mechanism 58 closes its contacts after the elapse of a predetermined period of time, a circuit will be established through the armature 56 and coil 88 from the positive terminal of the source 84 through the reversing switch assembly 82 then conditioned by the actuator 72 to bridge contacts 81 and 83 and the contacts 85 and 87. Current will therefore flow through the armature in one direction to produce rotation in one direction. The switch actuator 72 for the reversing switch assembly 82 in its other operative position will bridge the contacts 89 and 91 with contacts 83 and 87 respectively to establish a circuit through the armature 56 in a reverse direction so as to produce rotation in the reverse direction. Inasmuch as the valve assembly is in pressure engagement with its valve seat, the series motor will be heavily loaded for starting at a low speed and high torque to axially displace the drive assembly in the proper direction out of engagement with the valve seat before its speed increases to rapidly displace the valve assembly in an axial direction when loaded only by the screw threads of nut 48. The drive assembly and spool valve assembly connected thereto will then be axially moved by continued rotation of the motor in the proper direction producing axial movement of the drive assembly toward its other position with one of the projections 76 or 78 engaging the longitudinal edge of plate 68 to resist angular displacement of the drive assembly. When the valve assembly is axially moved into engagement with the other valve seat, to the position illustrated in FIGURE 5 for example, the lateral projection 78 riding on the top edge of the control plate will be aligned with the notch 80 so that retarded rotation of the valve assembly produced by pressure engagement with the valve seat will cause angular displacement of the drive assembly by a limited amount bringing the lateral projection 78 into the notch 80 as a result of which the switch actuator 72 will be displaced in the proper direction to a neutral position as shown in FIGURE 10 so as to interrupt the electrical connections to the armature 56. The motor will therefore be disabled after the drive assembly undergoes its limited angular displacement at which point it is also locked by the projection 78 against axial movement. In order to ascertain whether or not the motor has then been operatively conditioned by the reversing switch assembly or whether the other electrical connections are in good condition so as to permit operation of the mechanism, it will be observed from FIGURE 6, that the push button test switch 66 is connected in series with the test lamp 62 across the terminals of the timer 58. Accordingly, upon depression of the test switch 66, the motor circuit will be closed and the lamp 62 will be illuminated if the circuit is operative and will also be effective to provide illumination for the timer dial as aforementioned. Thus, closing of switch 66 will produce movement of the valve assembly to a seated condition at which point the drive assembly will be automatically disabled and locked. The timer 58 may then be set so that the drive assembly may be angularly displaced to an unlocked position upon closing of the timer switch when the motor is restarted in the proper direction.

From the foregoing description, the operation, construction and utility of the automatic fluid changing device, will be apparent. It will therefore be appreciated, that the automatic valve changing device will be operative in a reliable manner to pressure seal one or the other of the outlets to which it is moved at a preselected time without leakage. The foregoing reliable valve closing operation is obtained through use of a torque sensing arrangement whereby the drive mechanism for the valve is disabled and conditioned for reverse rotation when restarted at some other time in order to effect the next change. It will also be appreciated that the foregoing functions are achieved in a relatively simple manner and by a compact arrangement of parts so as to enhance reliability of operation as well as to reduce costs of manufacture.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In an automatic fluid distributing assembly having a housing with axially spaced outlets to which fluid distributing conduits may be connected and valve means axially movable between said outlets for pressure sealing engagement therewith to retard rotation thereof, valve operating means comprising shaft means mounted on said housing and connected with said valve means for imparting axial movement thereto in response to rotation thereof, rotary electric motor drive means connected to said shaft means for imparting rotation to the shaft means, circuitry including toggle switch means operatively connected to said rotary motor means for reversing the direction of rotation thereof, said switch means including an actuator movable with said motor means, guide means connected to said housing cooperating with guide structure associated with said motor means for guiding axial movement of said motor means in response to rotation thereof, said guide means including limit means for accommodating limited angular displacement of said motor means at the limit positions of the valve in response to torque loading of the shaft means at said limit positions, said limit means cooperating with said guide structure to lock said motor means and shaft means against axial movement in response to said limited angular displacement, said guide means also cooperating with said switch actuator to terminate current to the motor means in response to said limited angular displacement at either limit position, and timer means in series with said switch means and said motor means for periodically closing said circuit for a predetermined time at least long enough to accomplish movement of said valve from one limit position to the other.

2. The combination of claim 1 including selectively operated test means for indicating the operative condition of the circuitry and to illuminate the timer means, said test means including a test switch connected in parallel with said timer means and a lamp connected in series with the test switch.

References Cited by the Examiner

UNITED STATES PATENTS

| | | | |
|---|---|---|---|
| 645,696 | 3/00 | Topp | 137—625.5 XR |
| 916,403 | 3/09 | Adamson | 137—625.5 |
| 1,974,335 | 9/34 | Kimball | 251—134 |
| 2,005,891 | 6/35 | Elberty | 251—134 XR |
| 2,327,959 | 8/43 | Crow | 251—134 |
| 2,598,062 | 5/52 | Krecan | 251—134 |
| 2,825,862 | 3/58 | Price | 318—469 |

FOREIGN PATENTS

| | | |
|---|---|---|
| 231,313 | 6/44 | Switzerland. |

References Cited by the Applicant

UNITED STATES PATENTS

| | | |
|---|---|---|
| 1,686,851 | 10/28 | Gorman. |
| 1,977,961 | 10/34 | Berlyn. |
| 2,086,030 | 7/37 | Hodgson et al. |
| 2,686,894 | 8/54 | Mathieu. |
| 2,755,423 | 7/56 | Hager. |
| 2,882,045 | 4/59 | Moore. |
| 2,992,377 | 7/61 | Ekstrom. |
| 3,065,704 | 11/62 | Hill. |
| 3,087,103 | 4/63 | Swenson. |

FOREIGN PATENTS

| | | |
|---|---|---|
| 74,457 | 4/54 | Holland. |

WILLIAM F. O'DEA, *Primary Examiner.*

ISADOR WEIL, *Examiner.*